Aug. 8, 1939.   O. WITTEL   2,169,013
PHOTOGRAPHIC APPARATUS
Filed July 21, 1937

Otto Wittel,
INVENTOR.
BY
ATTORNEYS.

Patented Aug. 8, 1939

2,169,013

UNITED STATES PATENT OFFICE 2,169,013

PHOTOGRAPHIC APPARATUS

Otto Wittel, Rochester, N. Y., assignor to Eastman Kodak Company, Rochester, N. Y., a corporation of New Jersey Application July 21, 1937, Serial No. 154,839

4 Claims. (Cl. 179—100.3)

The present invention relates to film-type phonographic apparatus employing a scanning light beam and more particularly to an arrangement for properly controlling such beam.

In apparatus for recording or reproducing sound on a transparent film different standards prevail, some apparatus being designed to handle film having the sound track extending along one margin of the film while other apparatus is adapted for film having the sound track along its other margin. It is desirable to have a single apparatus which will accommodate either type of film and the obvious solution is to thread the film through the apparatus in such manner that the sound track is in alignment with the scanning beam. When so threaded some films will have its emulsion or record surface facing the optical system while other films will have such surface facing away from the optical system thus requiring a refocusing of the optical system whenever a change is made to a different type of film.

It is an object of the invention to provide an apparatus with which such adjustment of the scanning beam may be quickly and accurately made.

Another object of the invention is the provision for a sound optical system of a mounting arrangement which permits removal and replacement of the system without disturbing its adjusting mechanism.

Another object of the invention is the provision of a novel adjustable optical system which can be shifted accurately to proper axial position for a sound track carried on either face of a film.

Other objects and advantages of the invention will appear from the following description when read in connection with the accompanying drawing in which.

Figure 1:
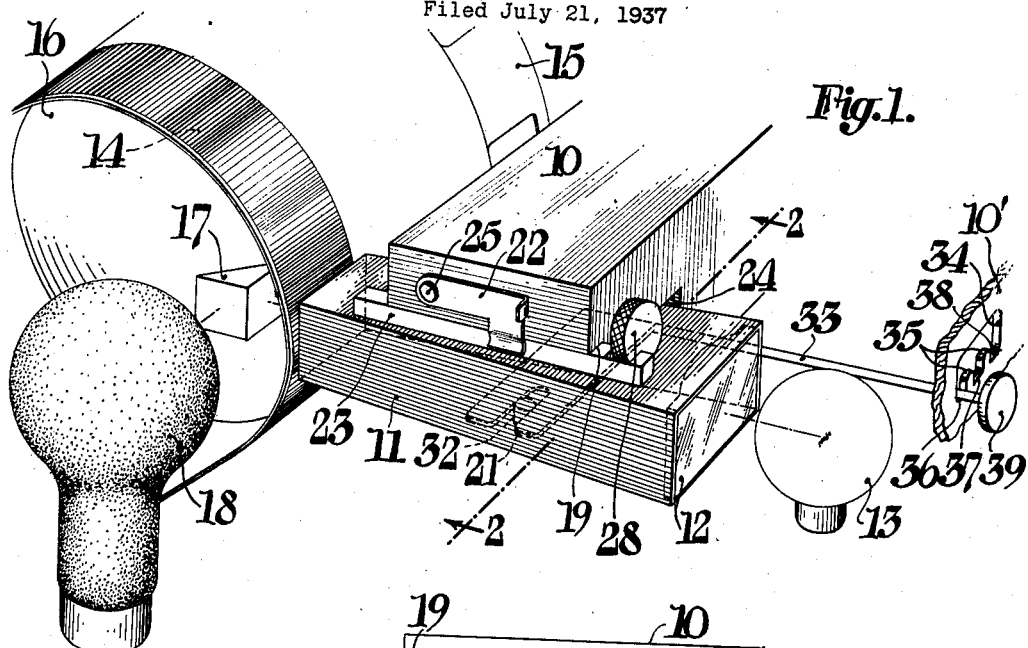
Fig. 1 is a partial view in perspective of an apparatus incorporating a mounting arrangement for the optical system embodying the invention.

In the drawing the invention is shown as applied to sound reproducing apparatus having a rigid frame 10 which supports a mount 11 for a suitable optical system including a lens 12 for focusing light from a source 13 in a narrow line on a sound track 14 carried by a transparent film 15. Suitable means such as a drum 16 moves the film 15 in any well known manner so that the sound record 14 modulates the light which it transmits and this modulated light is directed by prism 17 onto a light sensitive device 18 which translates it into varying electrical impulses which may later be converted into sound in the usual way.

Figure 2:
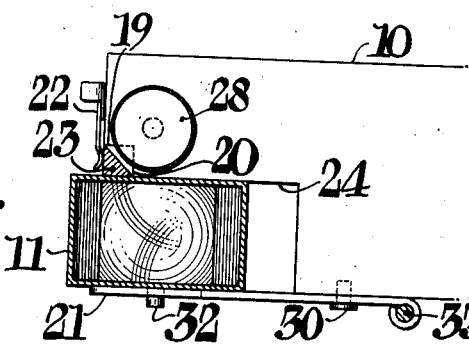
Fig. 2 is a transverse sectional view on line 2—2 of Fig. 1.

The frame member 10 is provided with a notch having an under face 19 and a front face 20 (see Fig. 2) against which a key 23 carried by the mount 11 is pressed by spring members 21 and 22, respectively. The faces 19 and 20 are so positioned with respect to the drum 16 that the optical system mount 11 is properly positioned vertically and laterally with respect to the sound track 14. The top wall of the mount 11 engages an under face 24 of the frame 10 to insure greater stability. This key 23 is accurately made and accurately positioned on the mount 11 so that its sides are parallel to the axis of the lens system carried by the mount 11 and perpendicular to the sound track at the point it is scanned. The retaining spring 22 urges the key 23 against the front face 20 of the frame member 10 and may be pivotally secured to the frame 10 by means of a headed pin 25 so that it may be rotated upwardly to permit lateral movement of the key 23, thus permitting the mount 11 to be withdrawn sidewise.

The key 23 is made long enough to extend beyond the frame 10 and this extending portion is provided with a notch to provide two opposing faces 26 and 27 separated from one another by a predetermined distance. The head 28 of a screw 29 extends into this notch when the mount 11 is in position and the axial thickness of the head 28 is accurately made smaller than the distance between the two faces 26 and 27 by an amount equal to the thickness of the film 15 which is to be employed in the apparatus. The spring member 21, which urges the mount upwardly, is pivotally secured to the frame 10 by a pin 30 and its free end which bears against the underside of the mount 11 is provided with an open slot 31 into which extends a downwardly extending stud 32 carried by the lower face of the mount 11. The member 21 has secured thereto a resilient arm 33 which, in a manner soon to be described, tends to rotate the member 21 about its pivot 30 in either direction as desired. This resilient arm 33 extends through an opening 34 provided in another portion of the frame 10'. This opening 34 is provided with two upwardly projecting lugs 35 to form three recesses 36, 37 and 38 into any one of which the resilient arm 33 may selectively be moved by means of a suitable knob 39 provided on its outer end.

The arrangement just described is so constructed that when the arm 33 is positioned in recess 36, as shown in Fig. 1, the resilience of the arm 33 rotates the member 21 about its pivot 30 to move the mount 11 and its key 23 toward the sound track 14 until the face 27 engages the head 28 of the screw 29. Movement of the arm 33 to a position in recess 38 reverses the direction of spring pressure to shift the mount 11 rearwardly until the abutting face 26 engages the head 28 of the screw 29 in which position the optical system will be focused on the front face of the film 15. When the arm 33 is in the recess 37 it is under no stress and in this position the mount 11 may readily be removed after the spring member 22 is moved out of the path of the key 23, the open slot 31 in the spring 21 permitting the escape of the pin 32 carried on the under face of the mount 11.

The screw 29 is screw threaded into the frame member 10 for obtaining original adjustment of the head 28 to the proper position for predetermining the two positions to which the mount 11 may be shifted. After such original adjustment of the screw 29 it remains fixed and the shifting of the mount 11 quickly and accurately secured by changing the position of the spring arm 33.

Figure 3:
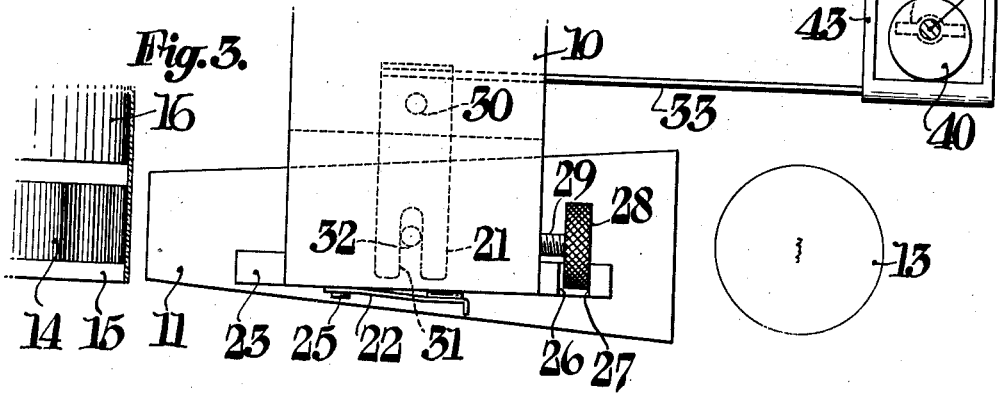
Fig. 3 is a plan view of the mounting means shown in Fig. 1 and with a modified adjusting arrangement.

The arrangement shown in Fig. 3 differs from that of Fig. 1 only in the device for placing strain on the spring arm 33 to provide the biasing force to the mount 11. In this embodiment, a cam 40 eccentrically mounted on a shaft 41 and rotatable therewith by means of a winged head 42 is shiftably secured to the frame (not shown) of the apparatus. A rectangular frame 43 carried by the free end of the arm 33 fits over the cam 40 so that rotation of the cam 40 through 180° imparts the desired change to the tension of the spring 33. Rotation of the cam 40 through 90° from the position shown corresponds to positioning the arm 33 in the middle recess 37 in Fig. 1 and in this position there is no bias to the mount 11.

In the embodiments shown in the drawing the mount 11 is biased to the position for scanning a sound record 14 carried on the face of the film 15 farthest removed from the incident light. If the next film to be reproduced has its record facing the incident light the necessary refocusing is quickly and accurately obtained by shifting the arm 33 to the recess 38 or as shown in Fig. 3 by rotating the cam 40 through 180°.

It is to be understood that the embodiment shown and described in detail is merely illustrative of my invention and that many other arrangements are obviously available for selectively biasing the mount for the optical system in each of two predetermined positions for the purpose described.

Although the invention has been shown as applied to a mount capable of assuming two focused positions and an intermediate free position for easy removal it will be obvious that the device of the invention may advantageously be employed when only one focused position is desired in which case the free position would permit easy removal for any purpose such as cleaning and just as easy return to a position of accurate focus.

What I claim as new and desire to secure by Letters Patent of the United States is:

1. In a sound head, a support, an optical system mount removably secured to the support, guide means on the support for determining the lateral position of said mount, means for yieldably pressing said mount against the guide means, stop means for determining the axial position of said mount, an abutment carried by said mount and adapted to engage the stop means, and releasable resilient means for biasing said abutment into firm engagement with said stop means.

2. A sound unit for motion picture projectors comprising a film scanning position, an optical unit for producing a scanning image, positioning means adjustable to alter the position of said unit longitudinally of its axis, and means for shifting said unit along its axis a predetermined fixed amount with respect to said positioning means, whereby the scanning image may alternately be made to occupy two predetermined positions with respect to said positioning means.

3. A sound head adapted to scan selectively a sound record carried on either face of a transparent support of predetermined thickness, comprising means for moving the sound record and its support past a point of translation, means including an optical system for forming a line of light, adjustable means for moving the optical system along its axis to cause the line of light to coincide with said translation point, and means for quickly shifting the optical system along its axis and with respect to said adjustable means a distance substantially equal to the thickness of the transparent support for the sound record.

4. Film-type phonographic apparatus comprising an optical system adapted to form a luminous image, means for adjusting the optical system axially to focus said image upon one surface of the film, and means for shifting said system axially with respect to said adjusting means by a distance substantially equal to the thickness of the film whereby said image may be quickly focused upon the other surface of the film.

OTTO WITTEL.